United States Patent Office 2,868,804
Patented Jan. 13, 1959

2,868,804
BETAINE ASCORBATE

Paul Lafumas and Jacques Cerezat, Choisy-le-Roi, France, assignors to Societe des Usines Chimiques Rhone-Poulenc, Paris, France, a French body corporate No Drawing. Application May 31, 1957
Serial No. 662,579

Claims priority, application France June 15, 1956

1 Claim. (Cl. 260—343.7)

This invention relates to new organic chemical compounds and is particularly concerned with salts of ascorbic acid.

The term "ascorbic acid" as used in this specification means L-ascorbic acid, otherwise known as vitamin C.

It is an object of this invention to provide a new salt of ascorbic acid which not only possesses the vitaminic properties of ascorbic acid but also possesses other desirable properties.

The new salt of the present invention is betaine ascorbate and it is a further feature of this invention to prepare the said salt by the action of ascorbic acid on betaine. The reactants may be used in equimolecular proportions or one or the other may be employed in slight excess.

Preferably the reaction is carried out in a medium in which the reactants are soluble, for example, in water or an organic solvent, such as an alcohol (e. g. methanol or ethanol) or in aqueous alcoholic solution. The reaction takes place at room temperature and while higher temperatures may be used they do not lead to any important advantage. The product is separated and dried, preferably in vacuo, and is generally pure enough for use; however, it can be purified if desired by recrystallisation or precipitation from solution.

The new salt has valuable pharmacodynamic properties. In particular it can be used in treating vitamin C deficiency. It is of excellent stability and has a useful lipotropic action.

The following examples will serve to illustrate the invention.

Example I

Betaine base (12 g.) and ascorbic acid (18 g.) are successively dissolved in water (20 cc.). The solution obtained is filtered and then poured into ethanol (10 volumes). The precipitated product is isolated and dried and betaine ascorbate (17.8 g.) is thus obtained.

Example II

Ascorbic acid (44 g.) is dissolved in a lukewarm solution of betaine base (29 g.) in ethanol (200 cc.) and allowed to crystallise. Betaine ascorbate (51 g.) is recovered in the form of a sandy white powder.

The ethanolic solution of betaine base can be obtained by dissolving solid betaine base in ethanol, or provided directly by the reaction between monochloracetic acid and trimethylamine.

Example III

Proceeding as in Example I, but evaporating the aqueous solution to dryness in vacuo, betaine ascorbate (29 g.) is obtained.

We claim:
As a new composition of matter betaine ascorbate.

References Cited in the file of this patent

UNITED STATES PATENTS

| | | |
|---|---|---|
| 2,539,483 | Ruskin | Jan. 30, 1951 |
| 2,585,580 | Opplt | Feb. 12, 1952 |